US012049155B2

(12) United States Patent
Qin

(10) Patent No.: US 12,049,155 B2
(45) Date of Patent: Jul. 30, 2024

(54) MULTI-BATTERY MANAGEMENT APPARATUS AND UNMANNED AERIAL VEHICLE

(71) Applicant: AUTEL ROBOTICS CO., LTD., Guangdong (CN)

(72) Inventor: Wei Qin, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 157 days.

(21) Appl. No.: 17/662,880

(22) Filed: May 11, 2022

(65) Prior Publication Data

US 2022/0340043 A1 Oct. 27, 2022

Related U.S. Application Data

(63) Continuation of application No. PCT/CN2020/124046, filed on Oct. 27, 2020.

(30) Foreign Application Priority Data

Nov. 12, 2019 (CN) .......................... 201911100233.8

(51) Int. Cl.
*B60L 58/18* (2019.01)
*B60L 3/00* (2019.01)
(Continued)

(52) U.S. Cl.
CPC ............. *B60L 58/18* (2019.02); *B60L 3/0046* (2013.01); *B64C 39/024* (2013.01); *B60L 2200/10* (2013.01); *B64U 50/19* (2023.01)

(58) Field of Classification Search
CPC ........ B60L 58/18; B60L 58/22; B60L 3/0046; B60L 2200/10; B64C 39/024; B64U 50/19
See application file for complete search history.

(56) References Cited

U.S. PATENT DOCUMENTS 10,752,127 B1\* 8/2020 Miyake ............... H01M 10/425
2013/0214739 A1\* 8/2013 Lee ....................... H02J 7/0048
320/118
(Continued)

FOREIGN PATENT DOCUMENTS

CN 102074991 A 5/2011
CN 103368268 A 10/2013
(Continued)

OTHER PUBLICATIONS

Machine translation of Qin (CN Pub No. 108462233 A) Pub Date Aug. 28, 2018 (Year: 2018).\*
(Continued)

*Primary Examiner* — Rodney A Bonnette

(57) ABSTRACT

Embodiments are a multi-battery management apparatus and an unmanned aerial vehicle. The apparatus includes at least two batteries, a mutual-charging switch, a voltage conversion module and a microprocessor; each of the batteries is connected to the microprocessor, and each of the batteries is also connected to the voltage conversion module by the mutual-charging switch; and the microprocessor is also respectively connected to a control terminal of the mutual-charging switch and the voltage conversion module. In the present invention, when an abnormal battery of which an electric quantity does not meet the storage condition occurs, a corresponding mutual-charging switch is controlled to be switch on, so that a battery with a higher electric quantity in the abnormal batteries charges a battery with a lower electric quantity.

18 Claims, 5 Drawing Sheets

(51) Int. Cl.
*B64C 39/02* (2023.01)
*B64U 50/19* (2023.01)

(56) References Cited

U.S. PATENT DOCUMENTS

2014/0266222 A1   9/2014   Baughman
2018/0056983 A1   3/2018   Yang et al.

FOREIGN PATENT DOCUMENTS

| | | |
|---|---|---|
| CN | 103647316 A | 3/2014 |
| CN | 108233487 A | 6/2018 |
| CN | 108462233 A | 8/2018 |
| CN | 108944479 A | 12/2018 |
| CN | 109103963 A | 12/2018 |
| CN | 110138046 A | 8/2019 |
| CN | 110293880 A | 10/2019 |
| CN | 110316388 A | 10/2019 |
| CN | 110323801 A | 10/2019 |
| CN | 110712529 A | 1/2020 |
| DE | 102014200329 A1 | 7/2015 |
| DE | 102014214996 A1 | 2/2016 |
| EP | 3309003 A1 | 4/2018 |

OTHER PUBLICATIONS

The International Search Report mailed Jan. 28, 2021; PCT/CN2020/124046 with English translation.
Chinese First Office Action dated Feb. 7, 2023; Appln. No. 202111138284.7 (Divisional application of the priority Chinese application 201911100233.8) (English Translation included).

* cited by examiner

MULTI-BATTERY MANAGEMENT APPARATUS AND UNMANNED AERIAL VEHICLE

CROSS REFERENCE

The present application is a continuation of International Patent Application No. PCT/CN2020/124046 filed on Oct. 27, 2020, which claims priority to Chinese Patent Application No. 2019111002338 filed on Nov. 12, 2019, both of which are incorporated herein by reference in their entireties.

BACKGROUND

Technical Field

Embodiments of the present invention relate to the technical field of batteries, and more particularly, to a multi-battery management apparatus and an unmanned aerial vehicle.

Related Art

When the battery is stored at a relatively high electric quantity, it is easy to cause safety accidents. Especially when the lithium battery is stored at a high electric quantity for a long time, it may lead to bulging of the battery, electric quantity degradation, and even fire accidents.

At present, in order to solve the problem of high electric quantity storage of batteries, the electric quantity of batteries is mostly monitored and discharged by a discharge circuit.

In carrying out the present invention, the inventor has found that the related art has at least the following problems.

The method of discharging the battery by the discharge circuit causes waste of electric energy. In particular, the waste of electric energy of the battery with large energy is serious.

SUMMARY

It is an object of embodiments of the present invention to provide a multi-battery management apparatus and an unmanned aerial vehicle that can reduce power waste while ensuring safe storage of batteries.

In order to solve the above technical problem, one technical solution adopted by the present invention is to provide a multi-battery management apparatus including at least two batteries, a mutual-charging switch, a voltage conversion module and a microprocessor;

wherein each of the batteries is connected to the microprocessor, and each of the batteries is also connected to the voltage conversion module by the mutual-charging switch;

the microprocessor is also respectively connected to a control terminal of the mutual-charging switch and the voltage conversion module;

the microprocessor comprises:

at least one processor, and a memory communicatively coupled to the at least one processor, the memory storing instructions executable by the at least one processor, the instructions being executed by the at least one processor to enable the at least one processor to:

Step 1: obtain electric quantity data of the battery;

Step 2: determine an abnormal battery in the batteries of which the electric quantity data does not comply with a preset range; and Step 3: control the voltage conversion module and the corresponding mutual-charging switch to switch on, so that, in the abnormal batteries, an abnormal battery having the electric quantity data greater than a first preset electric quantity value charges an abnormal battery having the electric quantity data less than a second preset electric quantity value, wherein the second preset electric quantity value is less than the first preset electric quantity value.

In some embodiments, the apparatus further comprises a discharge module;

The processor is further configured for:

if the electric quantity data of the battery is greater than the first preset electric quantity value, controlling the battery to discharge by the discharge module until the electric quantity data of the battery meets the preset range.

In some embodiments, the apparatus further comprises a supplemental power switch and a power supply, each of the batteries is connected to the power supply by the supplementary power switch, and the microprocessor is connected to a control terminal of the supplementary power switch;

the processor is further configured for:

if the electric quantity data of the battery is less than the second preset electric quantity value, controlling a corresponding supplemental power switch to switch off, so that the power supply charges the battery until the electric quantity data of the battery meets the preset range.

In some embodiments, the preset range is that the electric quantity data is greater than or equal to the second preset electric quantity value and less than or equal to the first preset electric quantity value; the processor is further capable of: for the abnormal batteries being charged with each other, determining whether the electric quantity data of the discharged abnormal battery is less than or equal to the first preset electric quantity value, and if so, controlling the corresponding mutual-charging switch to switch off so as to stop the discharging of the abnormal battery; and determining whether the electric quantity data of the charged abnormal battery is greater than or equal to the second preset electric quantity value, and if so, controlling the corresponding mutual-charging switch to switch off so as to stop the charging of the abnormal battery.

In some embodiments, if the electric quantity data of the battery is greater than the first preset electric quantity value, controlling the battery to discharge by the discharge module until the electric quantity data of the battery meets the preset range, comprises:

after the abnormal batteries are charged with each other, determining whether the electric quantity data of the batteries is greater than the first preset electric quantity value, and if so, controlling the batteries to be discharged by the discharge module until the electric quantity data of the batteries meets the preset range.

In some embodiments, the step of, if the electric quantity data of the battery is less than the second preset electric quantity value, controlling the corresponding supplemental power switch to switch on, so that the power supply charges the battery until the electric quantity data of the battery meets the preset range, comprises:

after the abnormal batteries are charged with each other, determining whether the electric quantity data of the batteries is less than the second preset electric quantity value, and if so, controlling a corresponding supplemental power switch to switch on, so that the power supply charges the batteries until the electric quantity data of the batteries meets the preset range.

In some embodiments, the power supply is further connected to the microprocessor to provide power to the microprocessor.

In some embodiments, the discharge module is connected to the voltage conversion module; and
the controlling the battery to be discharged by the discharge module comprises:
controlling the corresponding mutual-charging switch and the voltage conversion module to discharge the battery by the discharge module.

In some embodiments, the apparatus further comprises a discharge switch by which each battery is connected to the discharge module;
the controlling the battery to be discharged by the discharge module comprises:
controlling the corresponding discharge switch to switch on to discharge the battery by the discharge module.

In some embodiments, the processor is further capable of:
when it is detected that a new battery is inserted, the steps 1 to 3 are performed.

In order to solve the above technical problem, another technical solution adopted by the present invention is to provide an unmanned aerial vehicle comprising: a body; a wing connected to the body; and the multi-battery management apparatus as described above, the multi-battery management apparatus being provided in the body.

The embodiment of the present invention connects each battery to the voltage conversion module by the mutual-charging switch. When an abnormal battery of which an electric quantity does not meet the storage condition occurs, a corresponding mutual-charging switch is controlled to be switch on, so that a battery with a higher electric quantity in the abnormal batteries charges a battery with a lower electric quantity. Therefore, the battery with a higher electric quantity does not waste electric energy due to discharge, and there is no need to use an additional charging power supply to charge the battery with a lower electric quantity. Each abnormal battery is charged with each other, thereby saving electric energy and reducing electric energy waste on the premise of ensuring the safe storage of the battery. Especially, the energy saving effect is obvious for large-electric quantity batteries.

BRIEF DESCRIPTION OF THE DRAWINGS

One or more embodiments are illustrated by way of example and not by way of limitation in the figures of the accompanying drawings, in which elements having the same reference numeral designations represent similar elements, and the figures are not to scale unless otherwise specified.

DETAILED DESCRIPTION

Figure 1:
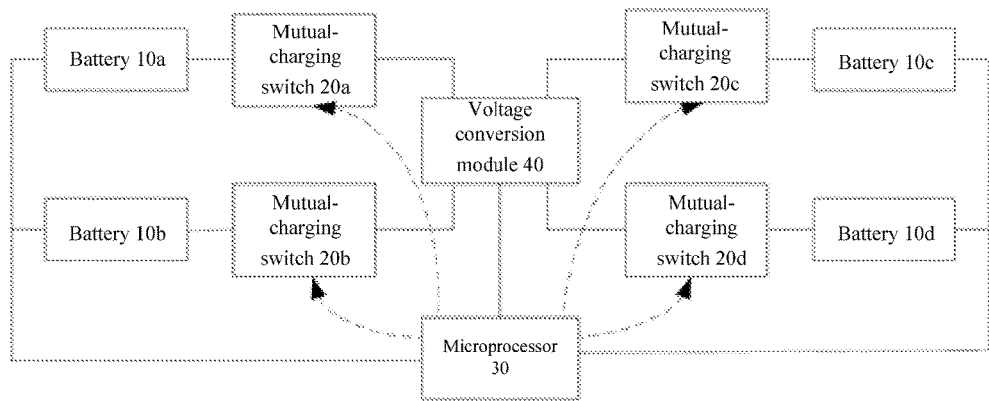
FIG. 1 is a structurally schematic view of a multi-battery management apparatus according to an embodiment of the present invention.

In order to facilitate the understanding of the invention, the technical scheme of the invention will be described clearly and completely in combination with the attached drawings below. Obviously, the described embodiments are part of the invention rather than all embodiments. Based on the embodiments in the invention, all other embodiments obtained by a person skilled in the art without involving any inventive effort are within the scope of protection of the invention.

In describing the present invention, it should be noted that the terms "central", "upper", "lower", "left", "right", "vertical", "horizontal", "inner", "outer" and the like are based on the directional or positional relationships shown in the drawings. It is merely for the purpose of describing the present invention and simplifying the description, and is not intended to indicate or imply that a particular orientation, configuration and operation of the referenced device or element is required and should not be construed as limiting the scope of the present invention. Furthermore, the terms "first" and "second" are used for descriptive purposes only and are not to be construed as indicating or implying relative importance.

In the description of the invention, it should be understood that the terms "mounted", "connected", or "connecting" are to be broadly construed as being, for example, fixedly connected, removably connected, or integrally connected, unless specifically stated and defined otherwise; and they may be connected directly or indirectly through an intermediary, and may be communication internal to two elements. The specific meaning of the above terms in this invention will be understood in specific circumstances by those of ordinary skill in the art.

Furthermore, the technical features involved in the different embodiments of the present invention described below can be combined with each other as long as they do not conflict with each other.

In the technical field of batteries, some products require batteries to have a higher discharge rate to meet the power demand. For lithium ion batteries, a higher discharge rate means a higher concentration of lithium ions. However, a higher concentration of lithium batteries stored for a long time at a high temperature, a high electric quantity and a low electric quantity may cause problems such as battery bulging and electric quantity fading. Therefore, there is a need for equalizing the amount of electric quantity in the battery. Embodiments of the present invention provide a multi-battery management apparatus capable of achieving safe storage of battery electric quantity while reducing waste of battery power.

Specifically, referring to FIG. 1, the battery management apparatus includes at least two batteries (e.g. batteries 10a, 10b, 10c, and 10d shown in FIGS. 1-4), a mutual-charging switch (e.g., mutual-charging switches 20a, 20b, 20c, and 20d shown in FIG. 1), a microprocessor 30, and a voltage conversion module 40. The at least two batteries are respectively connected to the microprocessor 30, and the at least two batteries are also respectively connected to the voltage conversion module 40 via the mutual-charging switch. The microprocessor 30 is also connected to a control terminal of the mutual-charging switch and the voltage conversion module 40, respectively.

The battery may specifically be a lithium ion battery, a lithium polymer battery, or the like. The electric quantity of the battery is not particularly limited, and may be a large-electric quantity rechargeable lithium battery. A metering apparatus may be provided in the battery, and the metering apparatus is used for counting the real-time electric quantity of the battery. It is noted that, although only four batteries are illustrated in FIG. 1, the batteries may be two, three, or more, and are not limited to the four shown in FIG. 1.

The mutual-charging switch refers to an electronic component, such as a triode or the like, for interrupting the current supplied from the battery or causing the current to flow to another battery. By controlling the switching off or on of the mutual-charging switch, the at least two batteries can be charged with each other. In the present embodiment, the mutual-charging switches may be respectively provided, i.e. one battery corresponds to one mutual-charging switch. For example, as shown in FIG. 1, a battery 10a, a battery 10b, a battery 10c and a battery 10d respectively correspond to a mutual-charging switch 20a, a mutual-charging switch 20b, a mutual-charging switch 20c and a mutual-charging switch 20d one by one. The mutual-charging switch may also be an integral apparatus, essentially a switching apparatus integrating a plurality of mutual-charging switches together. In this embodiment, the microprocessor 30 controls the switching off or on of the mutual-charging switch.

The microprocessor 30 is a control core of the whole multi-battery management apparatus, and can execute one or more logic judgment steps and realize interaction with an external apparatus via a corresponding interface (for example, obtaining the electric quantity of a battery, controlling the mutual-charging switch to switch off or on, etc.). The microprocessor 30 may be any suitable processor having computing and logic control functions, such as a single chip computer or the like.

In the present embodiment, the microprocessor 30 may include at least one processor, and a memory communicatively coupled to the at least one processor.

The processor may be any type of single-threaded or multi-threaded processor having one or more processing cores as cores of the microprocessor 30 for acquiring data, performing logical operation functions, and issuing operational processing results.

Figure 5:
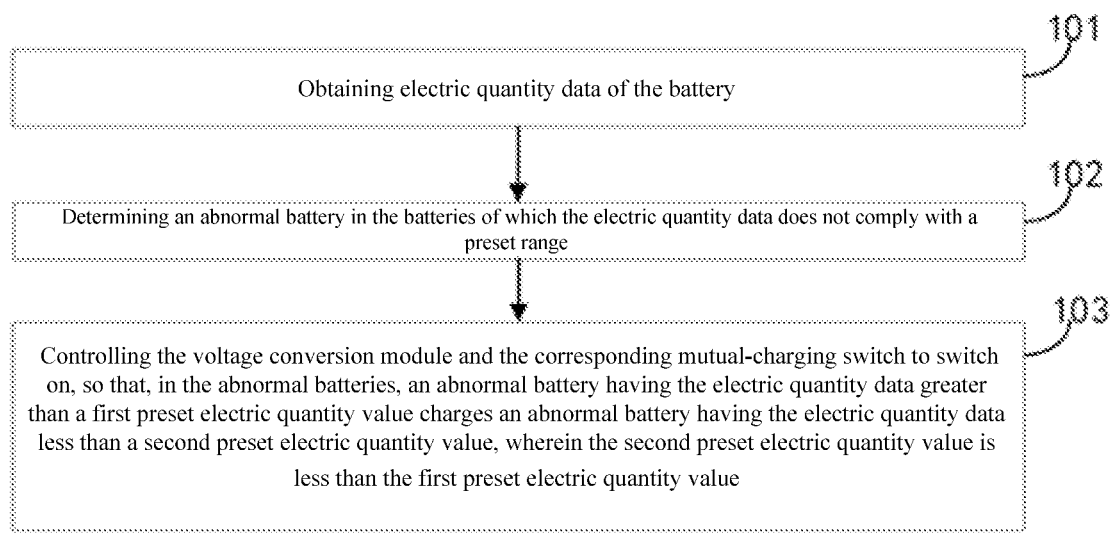
FIG. 5 is a flowchart of a method for implementing battery charging and discharging by a multi-battery management apparatus according to an embodiment of the present invention.

The memory serves as a non-volatile computer-readable storage medium such as at least one disk storage apparatus, a flash memory apparatus, a distributed storage apparatus remotely located from the processor, or other non-volatile solid-state storage apparatuses. The memory may have a data storage area for storing the result of the operation processing issued by the processor. The memory may also have a program storage area for storing non-volatile software programs, non-volatile computer-executable programs, and modules for invocation by the processor to cause the processor to perform one or more method steps. In this embodiment, the memory stores instructions executable by the at least one processor, the instructions being executed by the at least one processor to enable the at least one processor to perform the method as described below. As shown in FIG. 5, the method includes:

Step 101, obtaining electric quantity data of the battery;

Step 102, determining an abnormal battery in the batteries of which the electric quantity data does not comply with a preset range; and Step 103, controlling the voltage conversion module and the corresponding mutual-charging switch to switch on, so that, in the abnormal batteries, an abnormal battery having the electric quantity data greater than a first preset electric quantity value charges an abnormal battery having the electric quantity data less than a second preset electric quantity value, wherein the second preset electric quantity value is less than the first preset electric quantity value.

The electric quantity data of the battery, the first preset electric quantity value and the second preset electric quantity value can be battery electric quantity. The electric quantity data can be obtained by collecting the electric quantity of the battery itself via a metering apparatus carried by the battery itself, and the microprocessor 30 reads the electric quantity of the battery collected by the metering apparatus. The electric quantity data of the battery, the first preset electric quantity value and the second preset electric quantity value may also be an output voltage of the battery, namely, a voltage value. The microprocessor 30 acquires the voltage value of the battery to obtain the electric quantity data.

The preset range refers to a battery power range or a voltage range, and the specific value of the preset range can be set according to the size of battery electric quantity, the number of batteries, the connection relationship of the batteries, etc. in the current application scenario. For example, the preset range is that the electric quantity value of the battery is greater than or equal to a first preset electric quantity value and less than or equal to a second preset electric quantity value, which is represented by an interval, namely [a second preset electric quantity value, a first preset electric quantity value]. Herein, the first preset electric quantity value and the second preset electric quantity value can be set according to specific application conditions (such as the type of a battery and storage requirements, etc.). When the electric quantity data of the battery is not within the preset range (for example, the electric quantity data is less than the second preset electric quantity value or greater than the first preset electric quantity value), the battery is the abnormal battery (hereinafter, the preset range is [the second preset electric quantity value, the first preset electric quantity value] as an example).

After the abnormal battery is determined, the microprocessor 30 controls the corresponding mutual-charging switch to switch on, so that the battery having a higher electric quantity among the abnormal batteries charges the battery having a lower electric quantity. Specifically, the microprocessor first determines an abnormal battery having electric quantity data greater than a first preset electric quantity value and an abnormal battery having electric quantity data less than a second preset electric quantity value, and then controls a corresponding mutual-charging switch to switch on, so that the abnormal battery having the electric quantity data greater than the first preset electric quantity value charges the abnormal battery having the electric quantity data less than the second preset electric quantity value. By controlling the discharging and charging between the batteries so that the high-electric quantity battery charges the low-electric quantity battery, it is possible not only to keep the safe storage, but also waste of battery power can be avoided.

In order to ensure the charging effect, the discharging output of the battery is adjusted by the voltage conversion module 40 to meet the charging requirements of the battery. The voltage conversion module is composed of step-up and step-down circuits, and has bidirectional step-up and step-down functions. The microprocessor 30 adjusts the operation of the corresponding step-up circuit or step-down circuit according to the electric quantity data of the battery responsible for discharging and the electric quantity data of the battery needing to be charged, so that the output of the voltage conversion module can meet the charging requirements of the rechargeable battery. In some embodiments, the voltage conversion module 40 may include only one set of step-up and step-down circuits, and microprocessor 30 may only control one battery to charge one battery. In other embodiments, the voltage conversion module 40 may also include more than two sets of step-up and step-down circuits, and the microprocessor 30 may control the charging of the plurality of batteries, respectively.

In order to enable the abnormal battery of which the electric quantity data is greater than the first preset electric quantity value to charge the abnormal battery of which the electric quantity data is less than the second preset electric quantity value, the microprocessor 30 controls the corresponding mutual-charging switch to switch on, so that the voltage of the battery passes through the voltage conversion module 40 and is finally conducted to the corresponding battery. Therefore, the battery of which the electric quantity data is greater than the first preset electric quantity value is in a discharging state, and the battery of which the electric quantity data is less than the second preset electric quantity value is in a charging state.

In some embodiments, in order to prevent the battery from being overcharged or overdischarged, the microprocessor detects the electric quantity of the battery being charged and discharged in real time. When the electric quantity data of the discharge battery is less than or equal to the first preset electric quantity value, or the electric quantity data of the charged battery is greater than or equal to the second preset electric quantity value, the microprocessor 30 controls the corresponding mutual-charging switch to switch off, so that the discharge battery stops discharging, and the charge battery stops charging.

Figure 2:
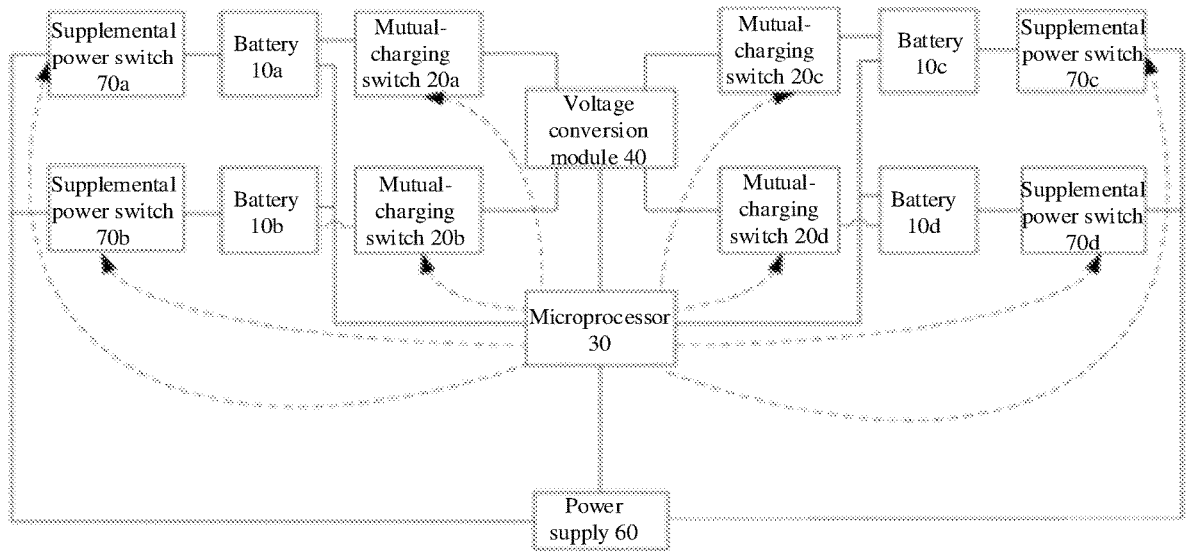
FIG. 2 is a structurally schematic view of a multi-battery management apparatus according to another embodiment of the present invention.

In some embodiments, to further ensure safe storage of the battery, referring to FIG. 2, the multi-battery management apparatus further includes a supplemental power switch (e.g. a supplemental power switch 70a, a supplemental power switch 70b, a supplemental power switch 70c, and a supplemental power switch 70d shown in FIG. 2) and a power supply 60. Each battery is connected to a power supply 60 by a supplemental power switch, and the microprocessor 30 is also connected to a control terminal of the supplemental power switch. The supplemental power switch refers to an electronic component, such as a triode or the like, for interrupting the current supplied from the power supply 60 or causing the current to flow to the battery. The supplemental power switches may be respectively provided, namely, one battery corresponds to one supplemental power switch. For example, as shown in FIG. 2, a battery 10a, a battery 10b, a battery 10c and a battery 10d respectively correspond to a supplemental power switch 70a, a supplemental power switch 70b, a supplemental power switch 70c and a supplemental power switch 70d one by one. The supplemental power switch may also be an integral apparatus, which is essentially a apparatus incorporating a plurality of supplemental power switches. In the present embodiment, when the electric quantity data of the battery is less than the second preset electric quantity value, the microprocessor 30 controls the corresponding supplemental power switch of the battery to switch on, so that the power supply 60 charges the battery until the electric quantity data of the battery meets the preset range.

It should be noted that, while the abnormal batteries are mutually charged, the microprocessor 30 controls the supplemental power switch corresponding to the abnormal battery having the electric quantity data less than the second preset electric quantity value to switch on, so that the power supply 60 discharges the battery until the electric quantity of the battery is greater than or equal to the second preset electric quantity value. The microprocessor 30 controls the supplemental power switch to switch off, so that the power supply 60 stops discharging.

In other embodiments, an abnormal battery recharge may be performed first, followed by a power supply recharge. Namely, if the electric quantity data of the battery is less than the second preset electric quantity value, the corresponding mutual-charging switch can be controlled to switch on firstly by the microprocessor 30. The battery of which the electric quantity data is greater than the first preset electric quantity value can be charged by the voltage conversion module 40 to the battery of which the electric quantity data is less than the second preset electric quantity value. After the abnormal batteries are charged with each other (namely, after the mutual charging of the batteries is finished), the microprocessor 30 then judges whether there is a battery having the electric quantity data less than a second preset electric quantity value in the battery, and if so, controls a supplemental power switch corresponding to the battery to switch on, so that the power supply 60 can continue to charge the battery until the electric quantity data of the battery meets the preset range. The energy-saving effect is better when the batteries are charged with each other and then charged by the power supply.

The power supply 60 may also power the microprocessor 30. Certainly, the microprocessor 30 may be powered by other power supplies.

Figure 3:
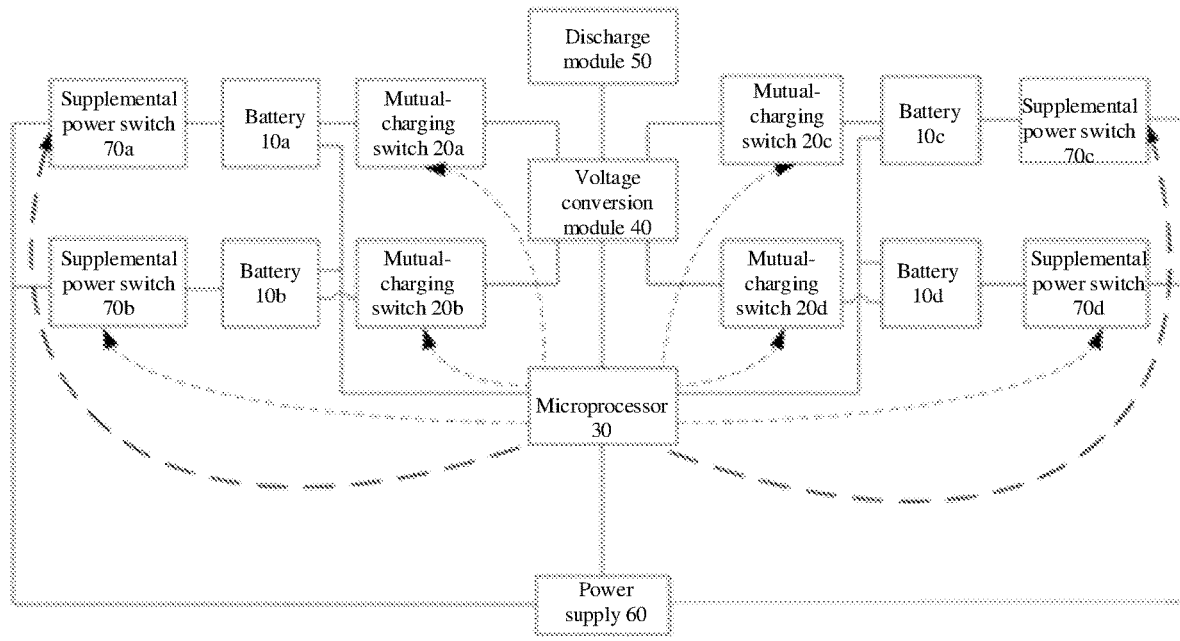
FIG. 3 is a structurally schematic view of a multi-battery management apparatus according to another embodiment of the present invention.
Figure 4:
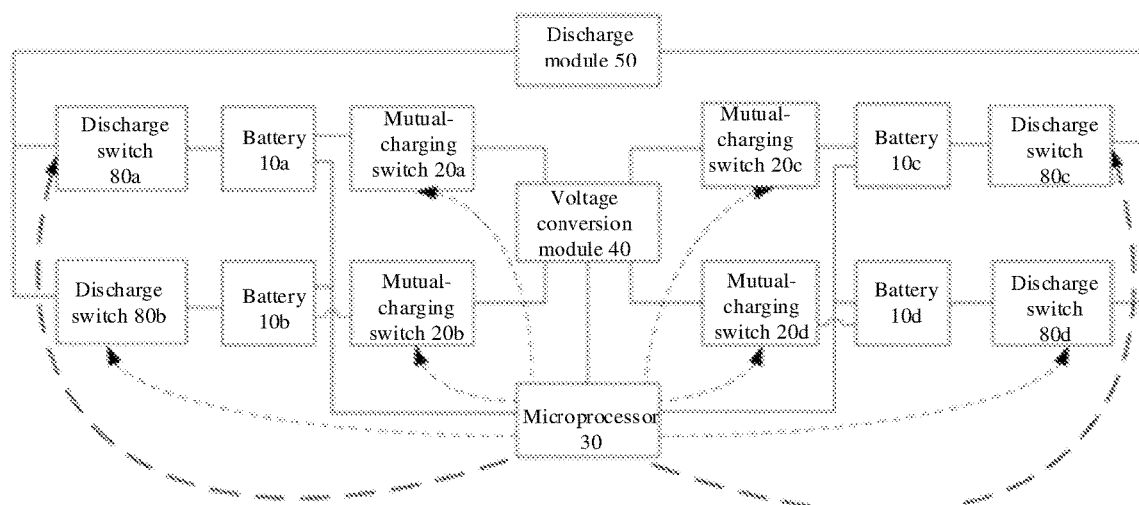
FIG. 4 is a structurally schematic view of a multi-battery management apparatus according to yet another embodiment of the present invention.

With continued reference to FIGS. 3 and 4, the multi-battery management apparatus further includes a discharge module 50. The discharge module 50 is used for discharging the battery when the electric quantity data of the battery is greater than a first preset electric quantity value. Specifically, the processor controls a battery having the electric quantity data greater than the first preset electric quantity value to be discharged by the discharge module 50 until the electric quantity data of the battery meets the preset range. The specific circuit of the discharge module 50 is not limited, and may be a power resistor, or a power transistor, etc.

In some of these embodiments, the discharge module 50 is connected to the voltage conversion module 40 connected with the voltage conversion module 40. The microprocessor 30 controls the mutual-charging switch corresponding to the battery to switch on, and communicates the discharge module 50 by the voltage conversion module 40, thereby discharging the battery by the discharge module 50.

Herein, when the abnormal batteries are mutually charged, the microprocessor 30 controls a corresponding mutual-charging switch of a battery with the electric quantity data greater than the first preset electric quantity value to switch on, and controls the voltage conversion module 40 to communicate with the discharge module 50, so that the battery is discharged by the discharge module 50 until the electric quantity data thereof meets the preset range. The microprocessor 30 controls the mutual-charging switch to switch off, so that the battery stops discharging.

In other embodiments, the abnormal batteries may be charged and discharged with each other and then discharged by the discharge module. Namely, the electric energy of the battery is firstly provided to the battery with the electric quantity data less than the second preset electric quantity value by the mutual-charging switch; after the abnormal batteries are charged with each other (namely, after the mutual charging of the batteries ends), the microprocessor 30 then judges whether there is a battery with electric quantity data greater than the first preset electric quantity value in the battery; if so, the corresponding mutual-charging switch of the battery is controlled to switch on; at the same time, the voltage conversion module 40 is controlled to communicate with the discharge module 50, so that the battery is discharged by the discharge module 50 until the electric quantity data thereof meets the preset range; and the microprocessor 30 controls the mutual-charging switch to switch off, so that the battery stops discharging. The energy-saving effect is better when the batteries are mutually charged and then discharged by the power supply module.

In other embodiments, as shown in FIG. 4, the multi-battery management apparatus further includes a discharge switch (e.g. a discharge switch 80a, a discharge switch 80b, a discharge switch 80c, and a discharge switch 80d shown in FIG. 4) connected to the battery and the discharge module 50, respectively. The discharge switch refers to an electronic component, such as a triode or the like, for interrupting the current supplied from the battery or causing the current to flow to the discharge module. The discharge switches may be respectively provided, i.e. one battery corresponds to one discharge switch. For example, as shown in FIG. 4, a battery 10a, a battery 10b, a battery 10c and a battery 10d respectively correspond to an electric switch 80a, a discharge switch 80b, a discharge switch 80c and a discharge switch 80d one by one. The discharge switch may also be an integral apparatus, which is essentially a apparatus incorporating a plurality of discharge switches. In the present embodiment, each battery is connected to the discharge module 50 by the discharge switch, and the microprocessor 30 controls the corresponding discharge switch to switch on, so that the current of the battery corresponding to the discharge switch flows to the discharge module 50 by the discharge switch and is discharged by the discharge module 50.

Herein, when the abnormal batteries are mutually charged, the microprocessor 30 controls the corresponding discharge switch of the battery with the electric quantity data greater than the first preset electric quantity value to switch on, so that the battery is discharged by the discharge module 50 until the electric quantity data thereof meets the preset range. The microprocessor 30 controls the discharge switch to switch off, so that the battery stops discharging.

In other embodiments, the electric energy of the battery is firstly provided to the battery with electric quantity data less than the second preset electric quantity value by the mutual-charging switch; after the abnormal batteries are charged with each other (namely, after the mutual charging of the batteries ends), the microprocessor 30 then judges whether there is a battery with electric quantity data greater than the first preset electric quantity value in the battery; if so, the corresponding discharge switch of the battery is controlled to switch on so as to discharge the battery by the discharge module 50 until the electric quantity data thereof meets the preset range. The microprocessor 30 controls the discharge switch to switch off so as to stop discharging the battery.

It should be noted that only one discharge module 50 is shown in FIG. 4, which is connected to all batteries. In other embodiments, there may be a discharge module 50 for each battery, each battery being connected to a discharge module 50 by a discharge switch. When the battery needs to be discharged, the discharge module 50 connected thereto performs a discharge operation.

In the above-described embodiment, when the battery electric quantity is overcharged, it is also possible to continue the discharging operation for the battery with a too high electric quantity by the discharge module after the mutual charging between the abnormal batteries is completed, thereby further ensuring the safety of the battery.

The operation of the multi-battery management apparatus will now be described in a specific embodiment.

Figure 6:
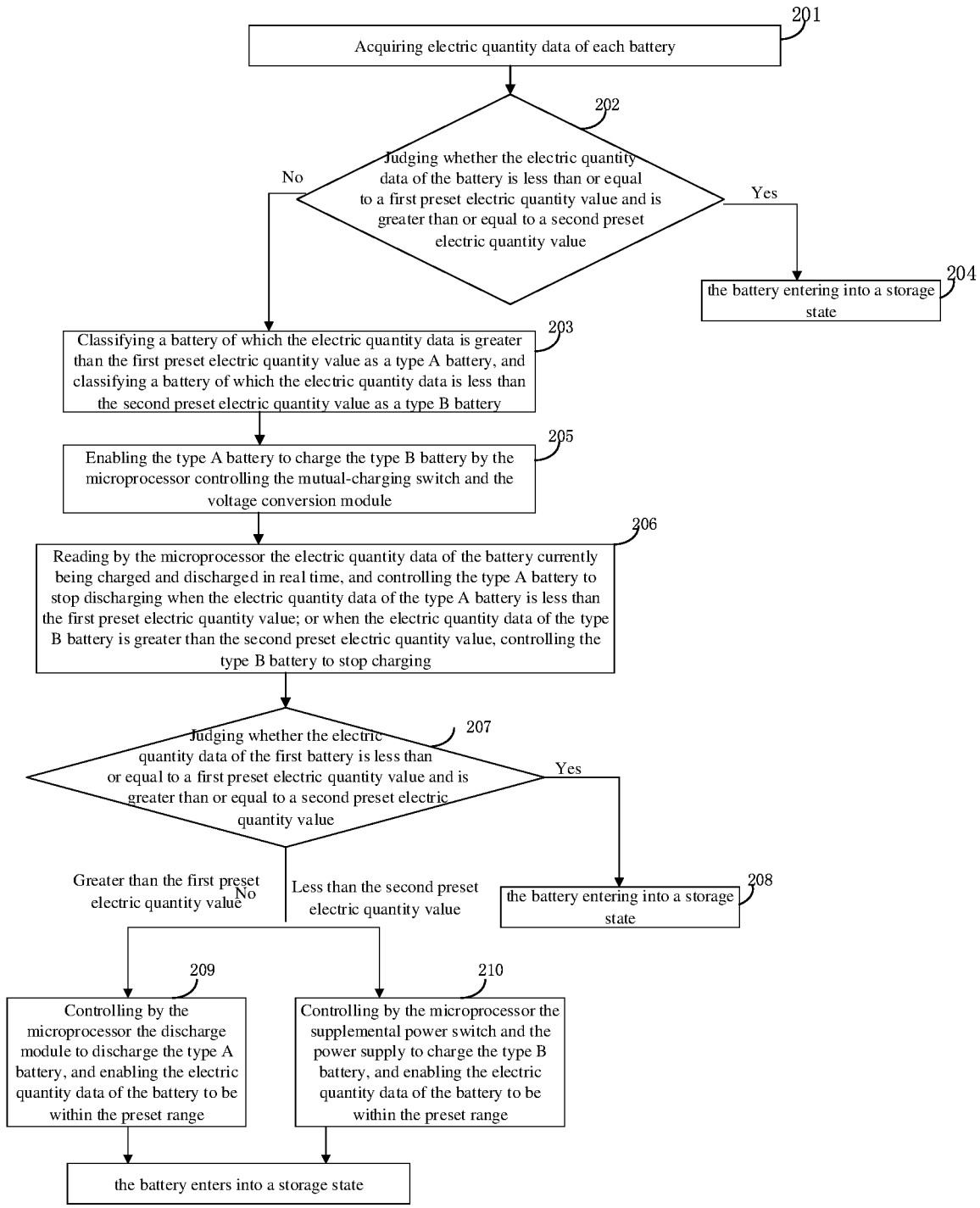
FIG. 6 is a flowchart of a method for implementing battery charging and discharging by a multi-battery management apparatus according to another embodiment of the present invention.

Reference is now made to FIG. 6, which is a flow chart of a method for implementing battery charging and discharging by the multi-battery management apparatus.

In step 201, acquiring electric quantity data of each battery.

Step 202, judging whether the electric quantity data of the battery is less than or equal to a first preset electric quantity value and is greater than or equal to a second preset electric quantity value;

if not, Step 203 is executed, and if so, Step 204 is executed.

Step 203, classifying a battery of which the electric quantity data is greater than the first preset electric quantity value as a type A battery, and classifying a battery of which the electric quantity data is less than the second preset electric quantity value as a type B battery.

Step 204, the battery entering into a storage state. Herein, the storage state may be a dormant state.

Step 205, enabling the type A battery to charge the type B battery by the microprocessor controlling the mutual-charging switch and the voltage conversion module.

Step 206, reading by the microprocessor the electric quantity data of the battery currently being charged and discharged in real time, and controlling the type A battery to stop discharging when the electric quantity data of the type A battery is less than the first preset electric quantity value; or when the electric quantity data of the type B battery is greater than the second preset electric quantity value, controlling the type B battery to stop charging.

Step 207, judging whether the electric quantity data of the battery is less than or equal to a first preset electric quantity value and is greater than or equal to a second preset electric quantity value.

If so, Step 208 is performed. If not, Steps 209 and 210 are performed.

Step 208, the battery entering into a storage state.

Step 209, if the electric quantity data of the battery is greater than a first preset electric quantity value, controlling by the microprocessor the discharge module to discharge the type A battery, and enabling the electric quantity data of the battery to be within the preset range.

Step 210, if the electric quantity data of the battery is less than a second preset electric quantity value, the microprocessor controls the supplemental power switch and the power supply to charge the type B battery, and enables the electric quantity data of the battery to be within the preset range.

Herein, the preset range refers to that the electric quantity data of the battery is less than or equal to a first preset electric quantity value and greater than or equal to a second preset electric quantity value.

The above-described steps 201 to 210 may be performed by the multi-battery management apparatus described in the above-described embodiments, and detailed processes thereof may be referred to in the above-described apparatus embodiments.

Herein the above-mentioned battery storage method can be executed by the processor at any suitable moment. For example, at the time of starting up or at preset time intervals, and in addition, when it is detected that a new battery is inserted into the multi-battery management apparatus, the processor can execute the above-mentioned battery storage method again.

Figure 7:
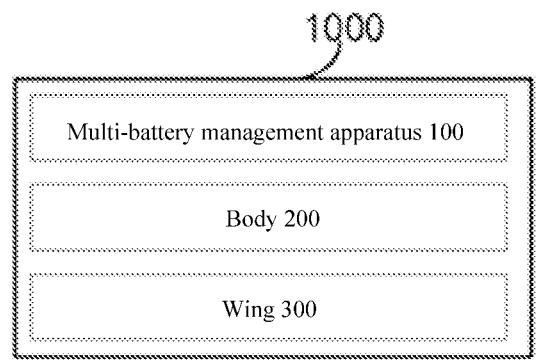
FIG. 7 is a structure block diagram of an unmanned aerial vehicle according to an embodiment of the present invention.

Referring to FIG. 7, the embodiment of the present invention also provides an unmanned aerial vehicle (UAV) 1000 including the multi-battery management apparatus 100 as described above, a body 200, and a wing 300 connected to the body 200. The multi-battery management apparatus 100 may be provided on the body 200.

In the present embodiment, the multi-battery management apparatus 100 is applied to an unmanned aerial vehicle 1000 for performing power data management on a battery of the unmanned aerial vehicle, so that the electric quantity data of the battery is stored in a preset range. Among other things, the unmanned aerial vehicle 1000 may be any suitable unmanned aerial vehicle, including fixed-wing unmanned aerial vehicles and rotary-wing unmanned aerial vehicles, such as helicopters, quadrotor aircrafts, and aircrafts having other numbers of rotor wings and/or rotor wing configurations. The unmanned aerial vehicle 1000 may also be other movable objects such as manned aircraft, models, unmanned airships, unmanned hot air balloons, robots, etc.

Since the unmanned aerial vehicle generally has a relatively high demand for the power of a battery, in the present embodiment, by providing the battery management apparatus on the unmanned aerial vehicle, it is possible to improve the safety of the battery electric quantity storage of the unmanned aerial vehicle, avoid the safety accident of the battery, and greatly extend the storage life of the battery of the unmanned aerial vehicle.

It should be noted that the description of the present invention and the accompanying drawings set forth preferred embodiments of the present invention. However, the present invention may be embodied in many different forms and should not be construed as limited to the embodiments set forth herein. The purpose of providing these embodiments is to give a more thorough understanding of the disclosed contents of the invention. Furthermore, the above-mentioned technical features are continuously combined with each other to form various embodiments which are not listed above and all are considered to be within the scope of the description of the present invention. Further, it will be apparent to those skilled in the art from the foregoing description that all such modifications and variations are considered to fall within the scope of the appended claims.

The invention claimed is:

1. A multi-battery management apparatus, wherein the apparatus comprises at least two batteries, a mutual-charging switch, a voltage conversion module and a microprocessor;

wherein each of the batteries is connected to the microprocessor, and each of the batteries is also connected to the voltage conversion module by the mutual-charging switch;

the microprocessor is also respectively connected to a control terminal of the mutual-charging switch and the voltage conversion module;

the microprocessor comprises:

at least one processor, and a memory communicatively coupled to the at least one processor, the memory storing instructions executable by the at least one processor, the instructions being executed by the at least one processor to enable the at least one processor to:

obtain electric quantity data of the battery;

determine an abnormal battery in the batteries of which the electric quantity data does not comply with a preset range; and control the voltage conversion module and a corresponding mutual-charging switch to switch on, so that, in the abnormal batteries, an abnormal battery having the electric quantity data greater than a first preset electric quantity value charges an abnormal battery having the electric quantity data less than a second preset electric quantity value, wherein the second preset electric quantity value is less than the first preset electric quantity value;

wherein the apparatus further comprises a supplemental power switch and a power supply, each of the batteries is connected to the power supply by the supplementary power switch, and the microprocessor is connected to a control terminal of the supplementary power switch;

the processor is further configured to:

when the electric quantity data of the battery is less than the second preset electric quantity value, control a corresponding supplemental power switch to switch off, so that the power supply charges the battery until the electric quantity data of the battery meets the preset range.

2. The multi-battery management apparatus according to claim 1, further comprising a discharge module;

the processor is further configured to:

when the electric quantity data of the battery is greater than the first preset electric quantity value, controlling the battery to discharge by the discharge module until the electric quantity data of the battery meets the preset range.

3. The multi-battery management apparatus according to claim 2, wherein the preset range is that the electric quantity data is greater than or equal to the second preset electric quantity value and less than or equal to the first preset electric quantity value;

the processor is further configured to:

for the abnormal batteries being charged with each other, determine whether the electric quantity data of the discharged abnormal battery is less than or equal to the first preset electric quantity value, and when the electric quantity data of the discharged abnormal battery is less than or equal to the first preset electric quantity value, control the corresponding mutual-charging switch to switch off so as to stop the discharging of the abnormal battery; and determine whether the electric quantity data of the charged abnormal battery is greater than or equal to the second preset electric quantity value, and when the electric quantity data of the charged abnormal battery is greater than or equal to the second preset electric quantity value, controlling the corresponding mutual-charging switch to switch off so as to stop the charging of the abnormal battery.

4. The multi-battery management apparatus according to claim 3, wherein the processor is further configured to:
after the abnormal batteries are charged with each other, determining whether the electric quantity data of the batteries is greater than the first preset electric quantity value;
and when the electric quantity data of the batteries is greater than the first preset electric quantity value, control the batteries to be discharged by the discharge module until the electric quantity data of the batteries meets the preset range.

5. The multi-battery management apparatus according to claim 3, wherein the processor is further configured to:
after the abnormal batteries are charged with each other, determine whether the electric quantity data of the batteries is less than the second preset electric quantity value;
and when the electric quantity data of the batteries is less than the second preset electric quantity value, control a corresponding supplemental power switch to switch off, so that the power supply charges the batteries until the electric quantity data of the batteries meets the preset range.

6. The multi-battery management apparatus according to claim 2, wherein the discharge module is connected to the voltage conversion module; and
the processor is further configured to:
control the corresponding mutual-charging switch and the voltage conversion module to discharge the battery by the discharge module.

7. The multi-battery management apparatus according to claim 2, wherein the apparatus further comprises a discharge switch by which each battery is connected to the discharge module; and
the processor is further configured to:
control the corresponding discharge switch to switch on to discharge the battery by the discharge module.

8. The multi-battery management apparatus according to claim 1, wherein the power supply is further connected to the microprocessor to provide power to the microprocessor.

9. The multi-battery management apparatus according to claim 1, wherein when it is detected that a new battery is inserted, the processor is further configured to:
obtain the electric quantity data of the battery;
determine an abnormal battery in the batteries of which the electric quantity data does not comply with a preset range; and
control the voltage conversion module and the corresponding mutual-charging switch to switch on, so that, in the abnormal batteries, an abnormal battery having the electric quantity data greater than a first preset electric quantity value charges an abnormal battery having the electric quantity data less than a second preset electric quantity value, wherein the second preset electric quantity value is less than the first preset electric quantity value.

10. An unmanned aerial vehicle (UAV), comprising:
a body;
a wing connected to the body;
a multi-battery management apparatus, wherein the apparatus is disposed in the body,
and the apparatus comprises at least two batteries, a mutual-charging switch, a voltage conversion module and a microprocessor;
wherein each of the batteries is connected to the microprocessor, and each of the batteries is also connected to the voltage conversion module by the mutual-charging switch;
the microprocessor is also respectively connected to a control terminal of the mutual-charging switch and the voltage conversion module;
the microprocessor comprises:
at least one processor, and
a memory communicatively coupled to the at least one processor, the memory storing instructions executable by the at least one processor, the instructions being executed by the at least one processor to enable the at least one processor to:
obtain electric quantity data of the battery;
determine an abnormal battery in the batteries of which the electric quantity data does not comply with a preset range; and
control the voltage conversion module and a corresponding mutual-charging switch to switch on, so that, in the abnormal batteries, an abnormal battery having the electric quantity data greater than a first preset electric quantity value charges an abnormal battery having the electric quantity data less than a second preset electric quantity value, wherein the second preset electric quantity value is less than the first preset electric quantity value;
wherein the apparatus further comprises a supplemental power switch and a power supply, each of the batteries is connected to the power supply by the supplementary power switch, and the microprocessor is connected to a control terminal of the supplementary power switch;
the processor is further configured to:
when the electric quantity data of the battery is less than the second preset electric quantity value, control a corresponding supplemental power switch to switch off, so that the power supply charges the battery until the electric quantity data of the battery meets the preset range.

11. The UAV according to claim 10, further comprising a discharge module;
the processor is further configured to:
when the electric quantity data of the battery is greater than the first preset electric quantity value, control the battery to discharge by the discharge module until the electric quantity data of the battery meets the preset range.

12. The UAV according to claim 11, wherein the preset range is that the electric quantity data is greater than or equal to the second preset electric quantity value and less than or equal to the first preset electric quantity value;
the processor is further configured to:
for the abnormal batteries being charged with each other, determining whether the electric quantity data of the discharged abnormal battery is less than or equal to the first preset electric quantity value;
and when the electric quantity data of the discharged abnormal battery is less than or equal to the first preset electric quantity value, control the corresponding mutual-charging switch to switch off so as to stop the discharging of the abnormal battery; and
determine whether the electric quantity data of the charged abnormal battery is greater than or equal to the second preset electric quantity value;
and when the electric quantity data of the discharged abnormal battery is less than or equal to the first preset electric quantity value, control the corresponding mutual-charging switch to switch off so as to stop the charging of the abnormal battery.

13. The UAV according to claim 12, wherein the processor is further configured to:
    after the abnormal batteries are charged with each other, determine whether the electric quantity data of the batteries is greater than the first preset electric quantity value;
    and when the electric quantity data of the batteries is greater than the first preset electric quantity value, control the batteries to be discharged by the discharge module until the electric quantity data of the batteries meets the preset range.

14. The UAV according to claim 12, wherein the processor is further configured to:
    after the abnormal batteries are charged with each other, determine whether the electric quantity data of the batteries is less than the second preset electric quantity value;
    and when the electric quantity data of the batteries is less than the second preset electric quantity value, control a corresponding supplemental power switch to switch off, so that the power supply charges the batteries until the electric quantity data of the batteries meets the preset range.

15. The UAV according to claim 11, wherein the discharge module is connected to the voltage conversion module; and
    the processor is further configured to:
        control the corresponding mutual-charging switch and the voltage conversion module to discharge the battery by the discharge module.

16. The UAV according to claim 11, wherein the apparatus further comprises a discharge switch by which each battery is connected to the discharge module; and
    the processor is further configured to:
        control the corresponding discharge switch to switch on to discharge the battery by the discharge module.

17. The UAV according to claim 10, wherein the power supply is further connected to the microprocessor to provide power to the microprocessor.

18. The UAV according to claim 10, wherein when it is detected that a new battery is inserted, the processor is further configured to:
    obtain the electric quantity data of the battery;
    determine an abnormal battery in the batteries of which the electric quantity data does not comply with a preset range; and
    control the voltage conversion module and the corresponding mutual-charging switch to switch on, so that, in the abnormal batteries, an abnormal battery having the electric quantity data greater than a first preset electric quantity value charges an abnormal battery having the electric quantity data less than a second preset electric quantity value, wherein the second preset electric quantity value is less than the first preset electric quantity value.

* * * * *